United States Patent
Chavez, Jr. et al.

(10) Patent No.: US 6,519,459 B1
(45) Date of Patent: *Feb. 11, 2003

(54) USE OF IMMEDIATE HANDOVER TO ACHIEVE MULTI-HEAD ZONES

(75) Inventors: David L. Chavez, Jr., Thornton; Stephen M. Thieler, Boulder, both of CO (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/515,312

(22) Filed: Feb. 29, 2000

(51) Int. Cl.[7] .................................................. H04Q 7/36
(52) U.S. Cl. ........................ 455/445; 455/453; 455/439
(58) Field of Search ................................. 455/453, 525, 455/445, 450, 452, 436, 437, 438, 439, 524, 417; 370/229, 237, 331, 236.1, 236.2

(56) References Cited

U.S. PATENT DOCUMENTS

| | | | | |
|---|---|---|---|---|
| 5,454,026 A | * | 9/1995 | Tanaka | 455/436 |
| 5,878,038 A | * | 3/1999 | Willey | 370/335 |
| 6,058,305 A | * | 5/2000 | Chavez, Jr. | 455/426 |
| 6,069,871 A | * | 5/2000 | Sharma et al. | 370/229 |
| 6,081,713 A | * | 6/2000 | Desgagne | 455/436 |

FOREIGN PATENT DOCUMENTS

| | | | |
|---|---|---|---|
| EP | 0 783 234 A | 7/1997 | H04Q/7/38 |
| WO | 98 52375 A | 11/1998 | H04Q/7/38 |

* cited by examiner

Primary Examiner—Vivian Chin
Assistant Examiner—Duc Nguyen
(74) Attorney, Agent, or Firm—John C. Moran

(57) ABSTRACT

A wireless handset does not perform a re-registration operation when its serving base station is at capacity, and a wireless controller controlling a wireless switching system is allowed to send incoming calls for the wireless handset to the base station even if the base station is at capacity. The base station signals a new call to the wireless even if the base station is at its active call capacity. The wireless handset is responsive to the incoming call to perform a base station re-direct operation to a new base station that has idle call capacity, and the call setup is completed to the wireless handset via the new base station. The base station re-direct operation is a new wireless operation. The base station re-direct operation is controlled by the system wireless controller in a second embodiment.

8 Claims, 6 Drawing Sheets

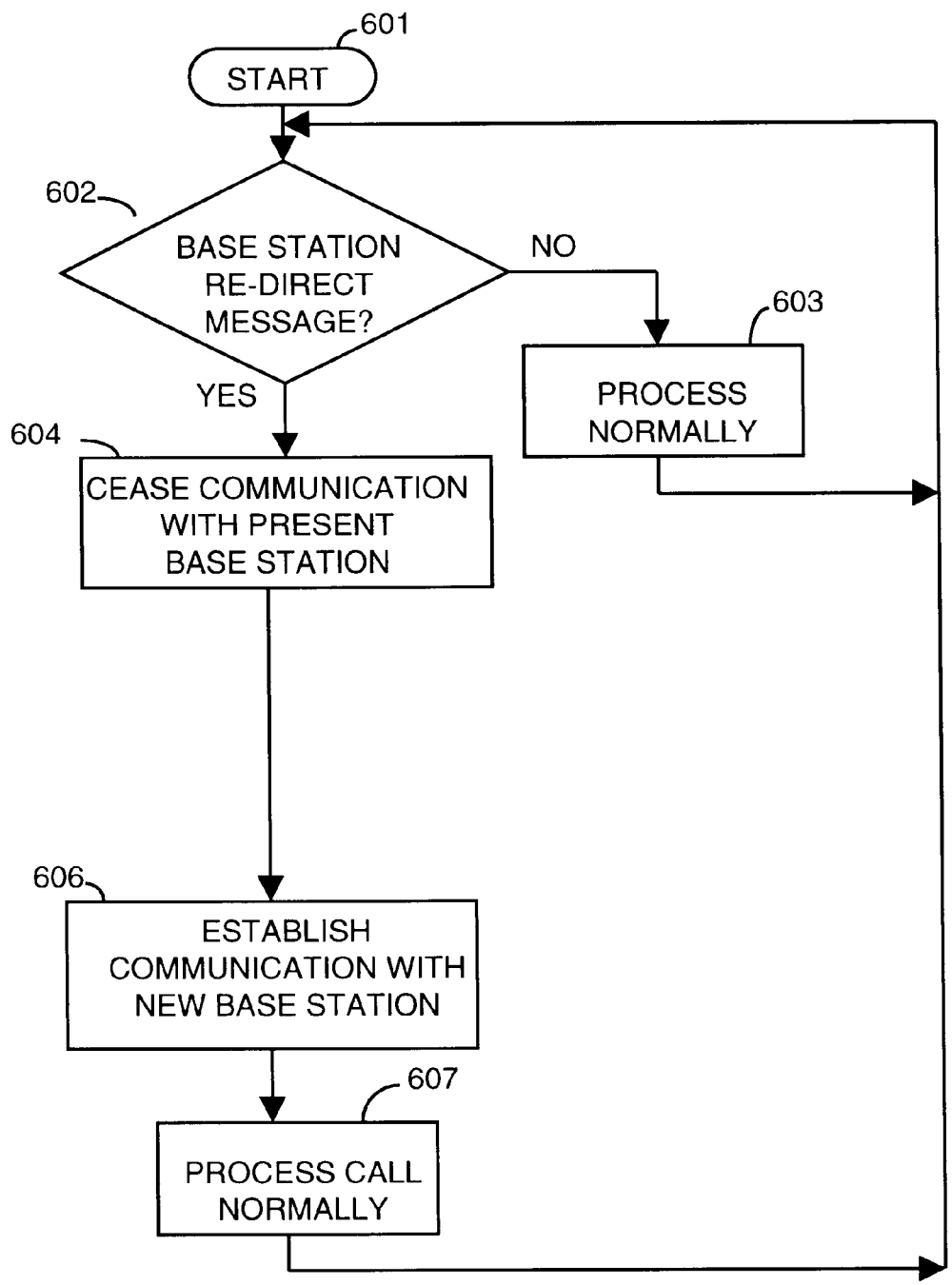

USE OF IMMEDIATE HANDOVER TO ACHIEVE MULTI-HEAD ZONES

TECHNICAL FIELD

This invention relates to wireless switching and, in particular, to routing of calls within a wireless switching system.

BACKGROUND OF THE INVENTION

A problem with the use of in-building or campus personal communication systems (PCS) is the limited capacity of the base stations to communicate active calls. Often in the prior art, the base stations are only capable of having two to four active calls at any time. However, a base station in such modern protocols as PHS, DECT, or PWT protocols can have more wireless handsets registered than the base station has the capacity to handle active calls. Unfortunately, one drawback with this approach is how to handle the case where a base station is at its active call capacity and a new call arrives for a handset currently registered on the base station. Some vendors attempt to overcome this problem by employing an algorithm in the handset to recognize when its serving base station is at capacity and then re-register to a new base station after a period of time. However, this causes two additional problems. First, while the handset is determining its condition and waiting, new calls to it cannot be delivered. Second, for some areas where a base station could have a large number of registered handsets, the algorithm will cause a large number of re-registrations from the base station. Further, when the call capacity of the base station becomes less than the maximum, a large number of registrations for wireless handsets returning to the base station also occur. Both of these problems have a de-stabilizing effect on a wireless switching system. Further, the problem, that doing frequent re-registrations present for a handset, is that the handset expends a great deal of power from its battery for each registration operation that it performs. This limits the time before the battery of a wireless handset must be recharged.

SUMMARY OF THE INVENTION

The foregoing problems are solved, and a technical advance is achieved, by an apparatus and method that results in a wireless handset not performing a re-registration operation when its serving base station is at capacity and allowing a wireless controller controlling a wireless switching system to send incoming calls for the wireless handset to the base station even if the base station is at capacity. The base station signals a new call to the wireless even if the base station is at its active call capacity. The wireless handset is responsive to the incoming call to perform a base station re-direct operation to a new base station that has idle call capacity and the call setup is completed to the wireless handset via the new base station. Advantageously, the base station re-direct operation is a new wireless operation for implementing the invention. advantageously, the base station re-direct operation is controlled by the system wireless controller in a second embodiment of the invention.

Other and further aspects of the present invention will become apparent during the course of the following description and by reference to the accompanying drawing.

BRIEF DESCRIPTION OF THE DRAWING

FIG. 6 illustrates, in flowchart form, steps performed by a wireless handset in implementing the second embodiment of the invention.

DETAILED DESCRIPTION

Figure 1:
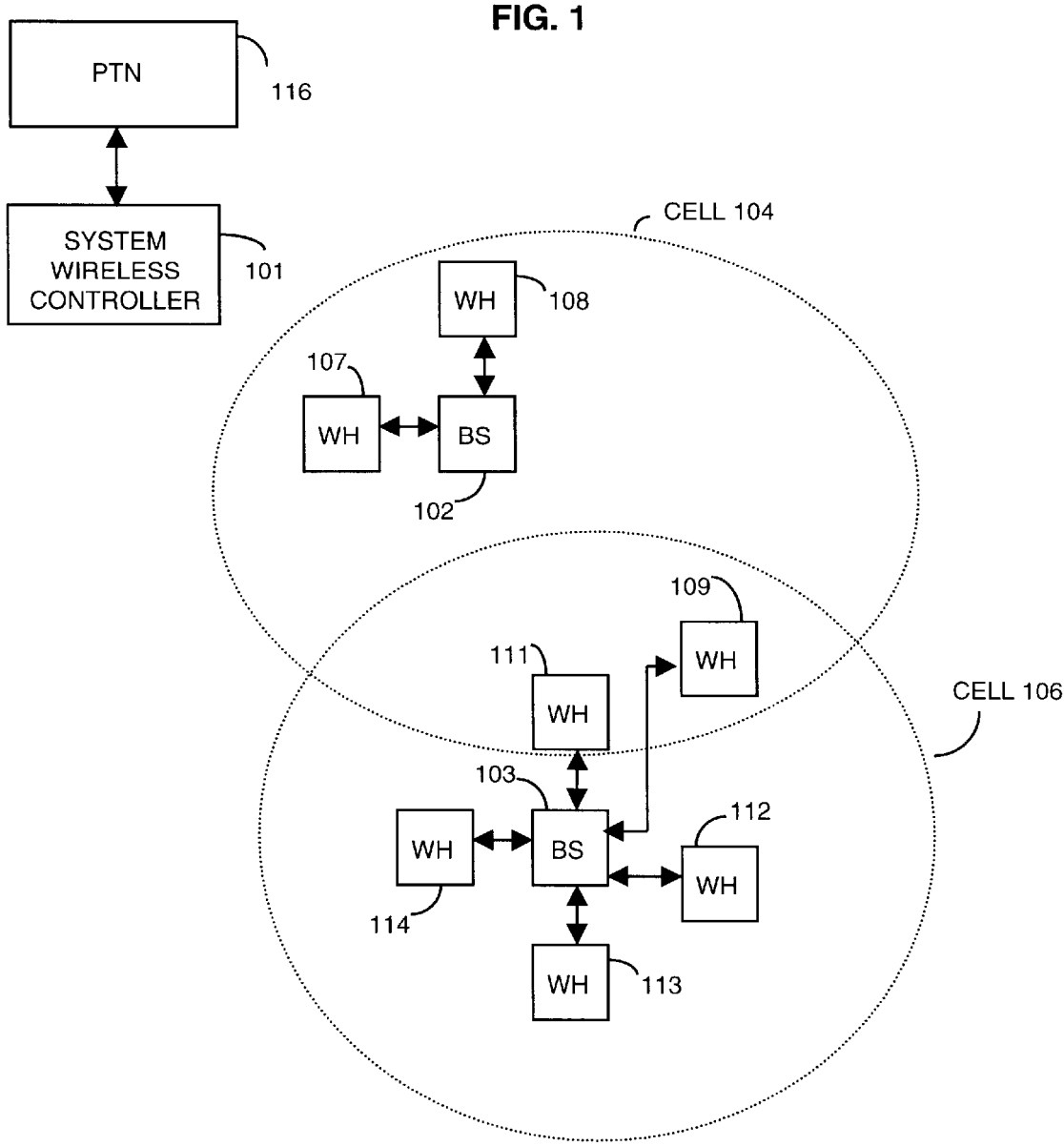
FIGS. 1 and 2 illustrate, in block diagram form, a wireless switching system for use with the invention.

FIG. 1 illustrates a wireless switching system that is controlled by system wireless controller 101. The latter controller not only provides control functions but also provides the switching of voice and data. Base stations 102 and 103 are interconnected to system wireless controller 101 via wired links not illustrated in FIG. 1. System wireless controller 101 is interconnected to public telephone network 116. The radio coverage area of a base station is indicated by its associated cell. For example, the cell for base station 102 is cell 104, and the cell for base station 103 is cell 106. As can be seen from FIG. 1, cells 104 and 106 do overlap. On skilled in the art could readily envision that there could be more base stations than base stations 102 and 103. Base stations 102 and 103 each have bandwidth or call capacity via the wired links to system wireless controller 101 to have two simultaneous active calls. However, in accordance with the invention, base stations 102 and 103 can have more wireless handsets, such as wireless handsets 107–114, registered on a base station than the base station has call capacity to handle active calls.

Figure 2:
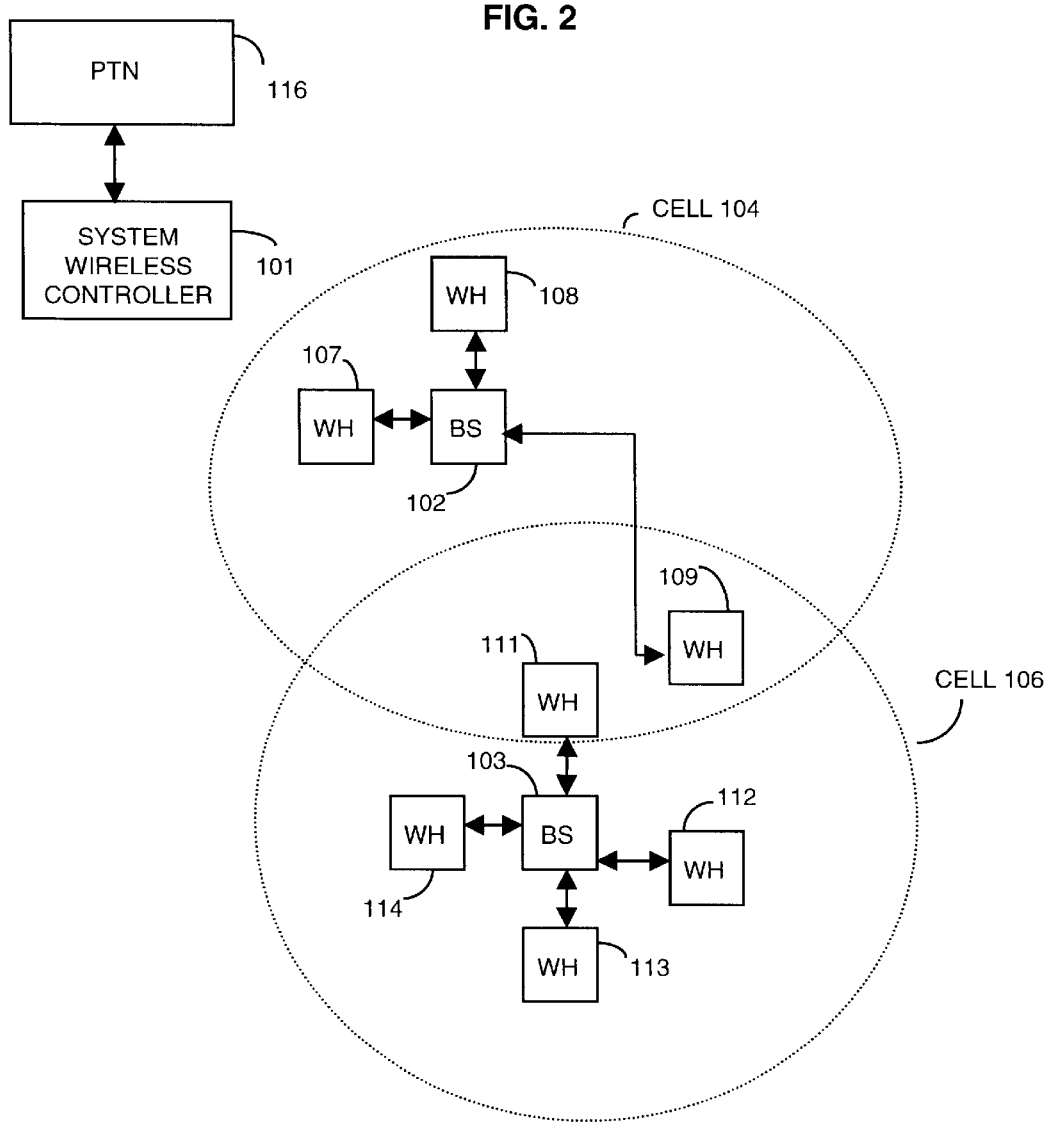

To better understand the invention consider the following example. On base station 102, only wireless handset 108 is engaged in an active call. However, on base station 103, both wireless handsets 112 and 113 are engaged in active calls thereby giving base station 103 no capacity to complete incoming or outgoing calls. Assume that a call is received for wireless handset 109. System wireless controller 101 transmits a call setup message to base station 103. Base station 103 relays this call setup message to wireless handset 109. Wireless handset 109 is responsive to the call setup message to commence the establishment of a call by wireless handset 109 performing a base station re-direct operation to base station 102. Wireless handset 109 establishes communication with base station 102 and identifies to base station 102 that a base station re-direct operation is taking place. Wireless handset 109 then sends a base station re-direct message to system wireless controller 101. The base station re-direct message specifies that wireless handset 109 is proceeding with the call but that the call will be completed on the new base station. The identity of base station 102 is specified in the base station re-direct message. Wireless handset 109 then ceases to communicate with base station 103. System wireless controller 101 is responsive to the base station re-direct message to process the call on base station 102 after the wireless handset 109 is in communication with base station 102. Since base station 102 has active call capacity to complete the call, when wireless handset 109 has finished the base station re-direct operation with base station 102, the call completion is performed with system wireless controller 101. Hence, wireless handset 109 can receive the call and continue talking on the call via base station 102. FIG. 2 illustrates the configuration of the wireless switching system after wireless handset 109 has performed a base station re-direct to base station 102.

Figure 3:
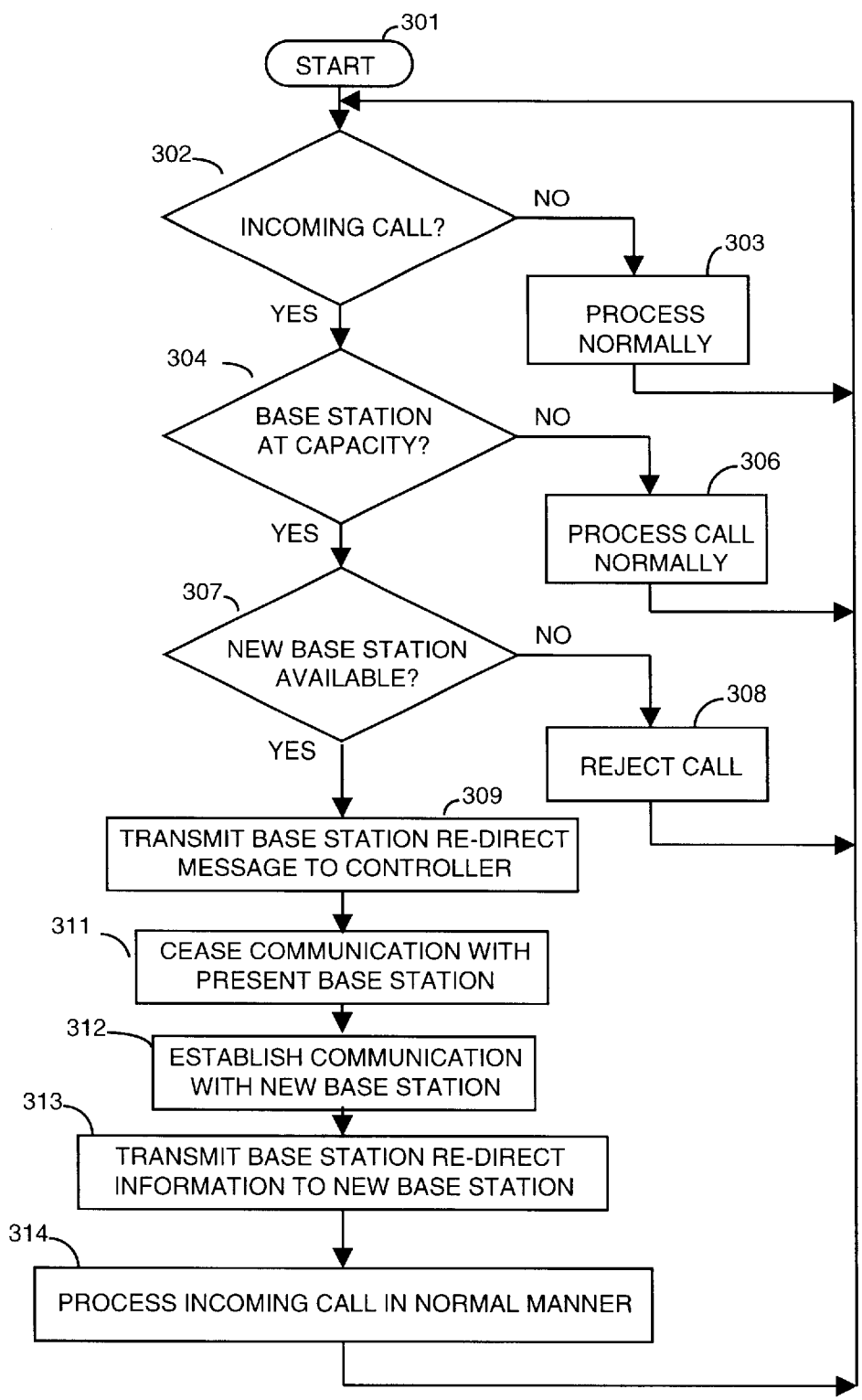
FIG. 3 illustrates, in flow chart form, steps performed by a wireless handset in implementing a first embodiment of the invention.

FIG. 3 illustrates, in flow chart form, the steps performed by an internal controller of a wireless handset, such as wireless handset 109, in implementing the first embodiment of the invention. When started from block 301, the controller of the wireless handset determines by execution of decision block 302 whether an incoming call is being received. If the answer is no, control is transferred to block 303 which performs normal processing before transferring control back to decision block 302. If the answer is yes in decision block 302, decision block 304 determines whether or not the base station on which the wireless handset is currently registered has no call capacity to complete the call to the wireless handset. If the answer is no indicating that the base station does have the capacity, block 306 is executed which processes the incoming call in a normal manner before transferring control back to decision block. 302. If the answer in decision block 304 is yes that the present base station is at its call capacity, decision block 307 determines if a new base station is available. The new base station has to be within radio range of the wireless handset plus have the capacity to handle an additional active call. If the answer in decision block 307 is no, control is transferred to block 308 which rejects the incoming call before transferring control back to decision block 302. If a new base station is available, block 309 accepts the call, and block 311 performs the base station re-direct operation to the new base station so that the call can be completed via the new base station before transferring control back to decision block 302.

Figure 4:
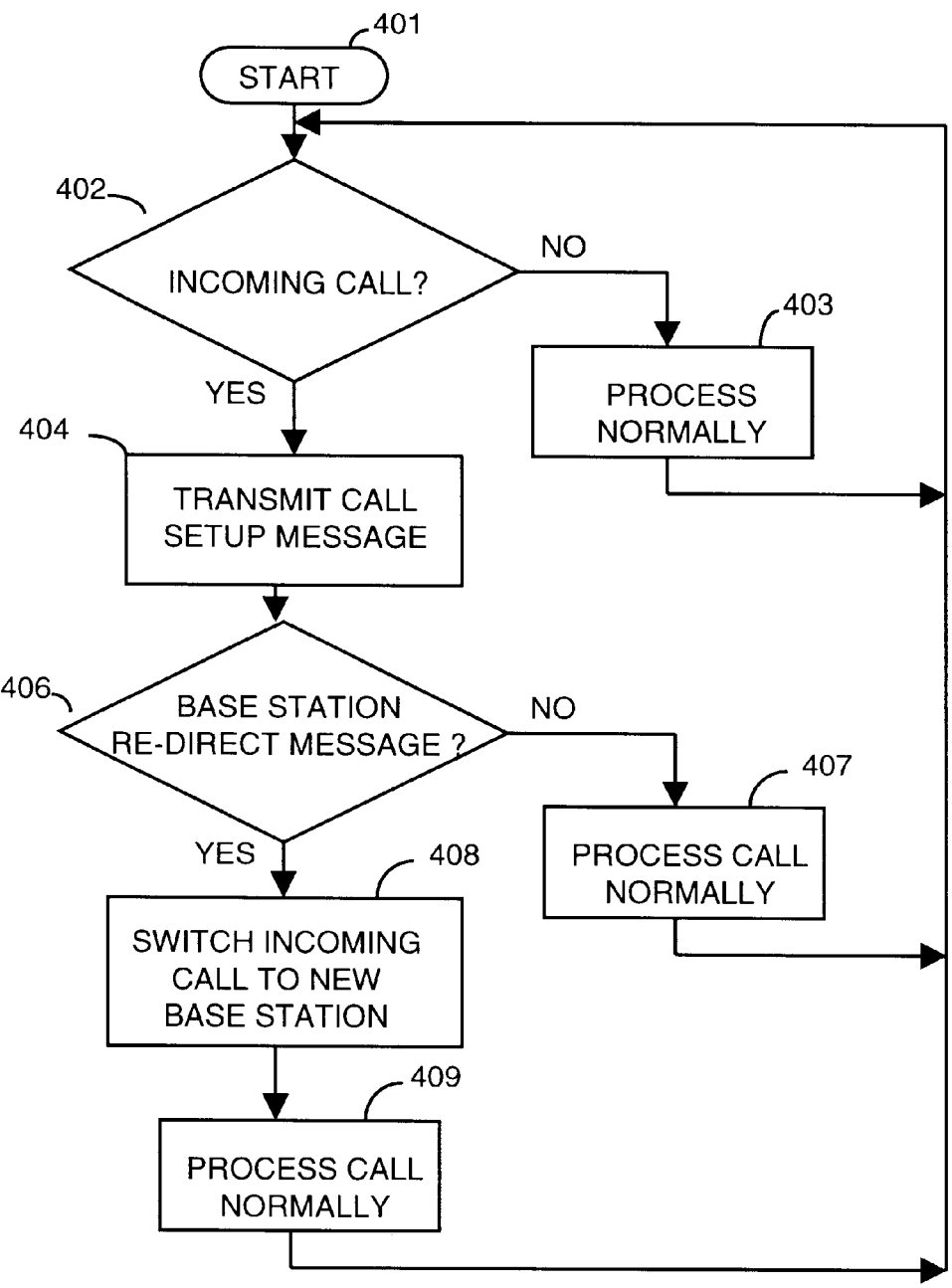
FIG. 4 illustrates, in flowchart form, steps performed by a system wireless controller in implementing the first embodiment of the invention.

FIG. 4 illustrates, in flowchart form, steps performed by system wireless controller 101 in implementing the first embodiment of the invention. Once started in block 401, decision block 402 determines if an incoming call is being received. If the answer is no, control is transferred to block 403 which processes the stimuli in a normal manner before returning control back to decision block 402. If the answer in decision block 402 is yes, control is transferred to block 404 that transmits a call set up message to the wireless handset being called. Then, decision block 406 determines whether the called wireless handset responds with the base station re-direct message. If the wireless handset does not reply with the base station re-directed message, control is transferred to block 407 which processes the call in a normal manner before returning control back to decision block 402. If the answer in decision block 406 is yes, block 408 switches the incoming call to the new base station identified in the base station re-directed message, and block 409 processes the incoming call in a normal manner before returning control back to decision block 402.

Figure 5:
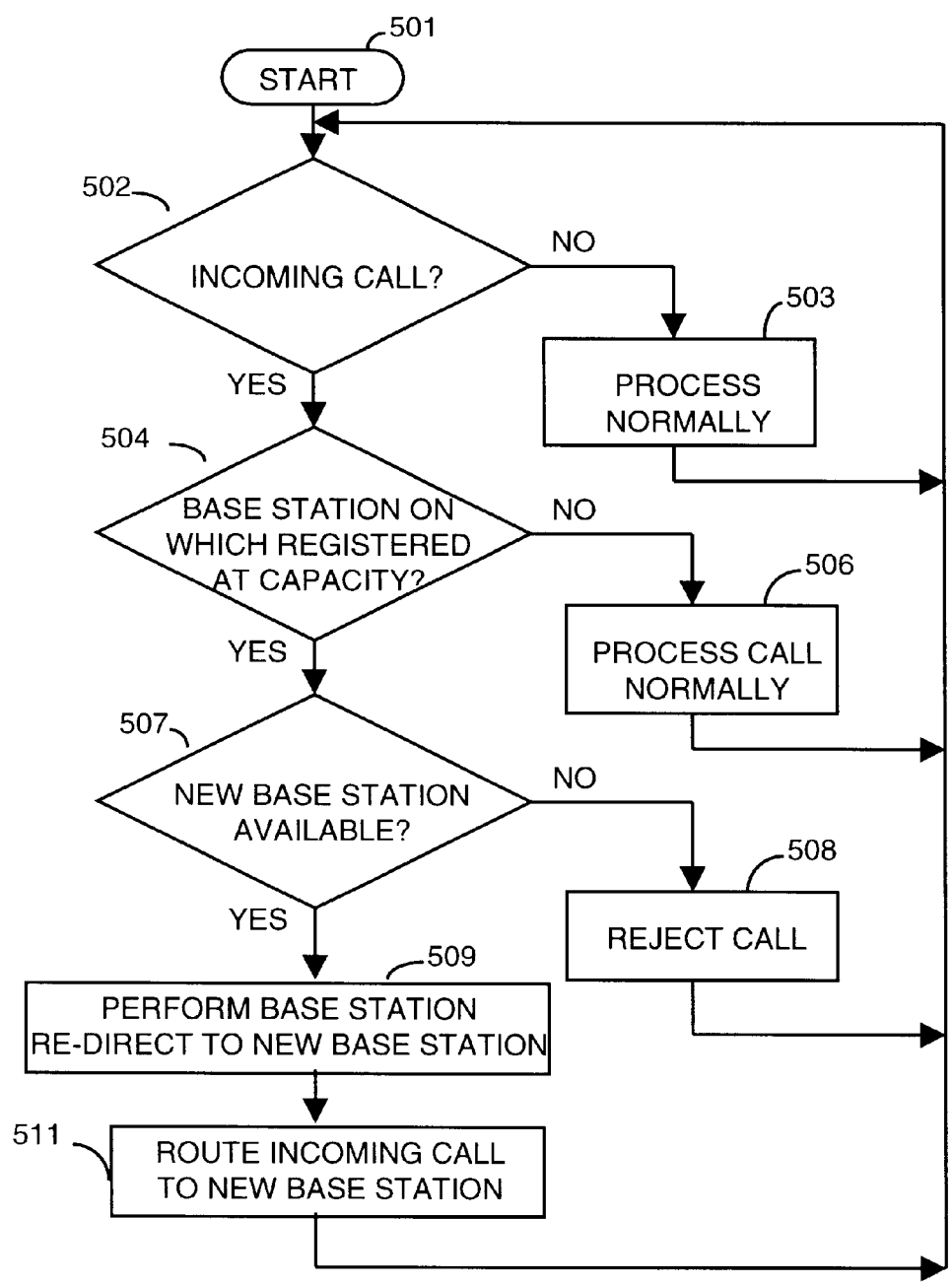
FIG. 5 illustrates, in flow chart form, steps performed by a system wireless controller in implementing a second embodiment of the invention.

FIG. 5 illustrates the steps performed by system wireless controller 101 in a second embodiment of the invention. When started from block 501, system wireless controller 101 determines by execution of decision block 502 whether an incoming call is being received. If the answer is no, control is transferred to block 503 which performs normal processing before transferring control back to decision block 502. If the answer is yes in decision block 502, decision block 504 determines whether or not the base station on which the called wireless handset is currently registered has no call capacity to complete the call to the wireless handset. If the answer is no indicating that the base station does have the capacity, block 506 is executed which processes the incoming call in a normal manner before transferring control back to decision block 502. If the answer in decision block 504 is yes that the present base station is at its call capacity, decision block 507 determines if a new base station is available to which the called wireless handset can perform a base station re-direct. The new base station has to be within radio range of the wireless handset plus have the capacity to handle an additional active call. If the answer in decision block 507 is no, control is transferred to block 508 which rejects the incoming call before transferring control back to decision block 502. If a new base station is available, block 509 accepts the call, and block 511 performs the base station re-direct operation of the wireless handset to the new base station so that the call can be completed via the new base station before transferring control back to decision block 502. The base station re-direct operation is performed by system wireless controller 101 signaling the called wireless handset to perform the base station re-direct communication with the new base station and to stop communicating with its present base station. System wireless controller 101 signals the new base station to perform its part of base station re-direct operation which to accept the wireless handset without a registration and then to complete the incoming call in conjunction with the wireless handset and system wireless controller 101.

FIG. 6 illustrates, in flowchart form, steps performed by a wireless handset in implementing the second embodiment of the invention. Once started in block 601, the wireless handset determines in decision block 602 if it is receiving a base station re-direct message from the system wireless controller. If the answer is no, control is transferred to block 603 which processes the stimuli in a normal manner before returning control back to decision block 602. If the answer in decision block 602 is yes, block 604 ceases communication with the present base station and establishes communication with the new base station by execution of block 606. Then, block 607 processes the incoming call in a normal manner before transferring control back to block 602.

Of course, various changes and modifications to the illustrative embodiment described above will be apparent to those skilled in the art. For example, the base stations could also implement the invention. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method for controlling incoming communication calls for a plurality of wireless handsets via a plurality of base stations, comprising the steps:

remaining registered by one of the plurality of wireless handsets on first one of the plurality of base stations after the first one of the plurality of base stations has exceed its capacity to communicate communication calls;

receiving by the one of the plurality of wireless handsets a call setup message for an incoming call from a system wireless controller via the first one of the plurality of base stations;

determining by the one of the plurality of wireless handsets a second one of the plurality of base stations that has capacity to communicate the incoming call;

performing a re-direct operation to the second one of the plurality of base stations by the one of the plurality of wireless handsets such that the one of the plurality of wireless handsets assumes registration status on the second one of the plurality of base stations;

transmitting a first message to the system wireless controller defining that the one of the plurality of wireless handsets is doing a re-direct operation to the second one of the plurality of base stations; and directing the incoming call to the one of the plurality of wireless handsets by the system wireless controller in response to the first message.

2. The method of claim 1 further comprises the step of ceasing to communicate with the first one of the plurality of base stations by the one of the plurality of wireless handsets.

3. The method of claim 2 further comprises the step of completing the incoming call by the one of the plurality of wireless handsets via the second one of plurality of base stations and the system wireless controller.

4. An apparatus for performing the method of claim 1.

5. A method for controlling incoming communication calls for a plurality of wireless handsets via a plurality of base stations by a system wireless controller, comprising the steps:

detecting an incoming call for one of the plurality of wireless handsets by the system wireless controller;

determining by the system wireless controller that first one of the plurality of base stations on which the one of the plurality of wireless handsets is registered has exceed its capacity to communicate communicating calls;

selecting by the system wireless controller a second one of the plurality of base stations that has capacity to communicate the incoming call to the one of the plurality of wireless handsets;

transmitting a first message to the one of the plurality of wireless handsets to inform the first one of the plurality of wireless handsets that it is to perform a re-direct operation to the second one of the plurality of base stations;

performing a re-direct operation to the second one of the plurality of base stations by the one of the plurality of wireless handsets in response to the first message such that the one of the plurality of wireless handsets assumes registration status on the second one of the plurality of base stations; and directing the incoming call to the one of the plurality of wireless handsets by the system wireless controller in response to the first message.

6. The method of claim 5 further comprises the step of ceasing to communicate with the first one of the plurality of base stations by the one of the plurality of wireless handsets in response to the first message.

7. The method of claim 6 further comprises the step of completing the incoming call with the one of the plurality of wireless handsets by the system wireless controller via the second one of plurality of base stations.

8. An apparatus for performing the method of claim 5.

* * * * *